(12) United States Patent
He et al.

(10) Patent No.: US 12,640,294 B2
(45) Date of Patent: May 26, 2026

(54) METHOD FOR PRODUCING LAMINATES SUITABLE FOR MAGNETIC CORES

(71) Applicant: HIS MAJESTY THE KING IN RIGHT OF CANADA, AS REPRESENTED BY THE MINISTER OF NATURAL RESOURCES, Ottawa (CA)

(72) Inventors: Youliang He, Hamilton (CA); Damir Sebesta, Hamilton (CA)

(73) Assignee: HIS MAJESTY THE KING IN RIGHT OF CANADA, REPRESENTED BY THE MINISTER OF NATURAL RESOURCES (CA)

( * ) Notice: Subject to any disclaimer, the term of this patent is extended or adjusted under 35 U.S.C. 154(b) by 1024 days.

(21) Appl. No.: 17/765,100

(22) PCT Filed: Nov. 18, 2020

(86) PCT No.: PCT/CA2020/051574
§ 371 (c)(1),
(2) Date: Mar. 30, 2022

(87) PCT Pub. No.: WO2021/097570
PCT Pub. Date: May 27, 2021

(65) Prior Publication Data
US 2022/0392678 A1     Dec. 8, 2022

Related U.S. Application Data

(60) Provisional application No. 62/937,639, filed on Nov. 19, 2019.

(51) Int. Cl.
H01F 7/06          (2006.01)
H01F 3/04          (2006.01)
(Continued)

(52) U.S. Cl.
CPC ........... H01F 3/04 (2013.01); H01F 41/0213 (2013.01); H02K 15/026 (2013.01)

(58) Field of Classification Search
CPC ..... H01F 3/04; H01F 41/0213; H02K 15/021; H02K 15/026; Y02P 80/30
See application file for complete search history.

(56) References Cited

U.S. PATENT DOCUMENTS 4,403,489  A  *  9/1983  Munsterman .......... B21D 28/22
                                                    72/131
4,622,835  A  *  11/1986  Bisson ..................... H02K 1/16
                                                    72/142

(Continued)

OTHER PUBLICATIONS

Patent Cooperation Treaty (PCT), International Search Report and Written Opinion for Application PCT/CA2020/051574 filed Nov. 18, 2020, mailed Feb. 4, 2021, International Searching Authority, CA.

*Primary Examiner* — Paul D Kim
(74) *Attorney, Agent, or Firm* — McDonald Hopkins LLC

(57) ABSTRACT

An oriented magnetic core lamination technique and a method of producing circular lamination cores. The method includes cutting rectangular strips with teeth pointing in a single direction (may not be the traverse or rolling direction) from the steel sheet plane, as opposed to directly punching circular laminates from the steel sheet with the teeth pointing in all directions. The strips are cut in such a way that the short side is aligned to the direction that has the best magnetic properties. The strips can then be bent into a donut or toroidal shape, either inwardly (with teeth pointing to the circle center) or outwardly (with teeth pointing out of the center) depending on the design of the lamination core. The direction with the best magnetic properties may be determined by non-destructive methods such as magnetic
(Continued)

Angular MBN          MBN Energy or RMS

TD

RD          Cut strips with the teeth at an angle θ to RD

Barkhausen noise (MBN) analysis, x-ray diffraction (XRD),
or electron backscatter diffraction (EBSD).

18 Claims, 15 Drawing Sheets

(51) Int. Cl.
    *H01F 41/02*         (2006.01)
    *H02K 15/026*       (2025.01)

(56)                References Cited

U.S. PATENT DOCUMENTS

| 6,993,822 | B2 * | 2/2006 | Park ..................... | H02K 15/026 |
| | | | | 29/596 |
| 8,786,158 | B2 * | 7/2014 | Neuenschwander ........................ | |
| | | | | H02K 15/022 |
| | | | | 310/216.043 |
| 2003/0201864 | A1 | 10/2003 | Decristofaro et al. | |
| 2005/0258705 | A1 | 11/2005 | Berwald et al. | |

\* cited by examiner (a)    Inward Bending

(b)

Mandrel diameter is smaller than the inner diameter of the core

P2

P1

Spring back of the bent strip

(a)

METHOD FOR PRODUCING LAMINATES SUITABLE FOR MAGNETIC CORES

CROSS-REFERENCE TO RELATED APPLICATION

This application is a 35 U.S.C. 371 national stage filing of PCT Application No. PCT/CA2020/051574 filed on Nov. 18, 2020, entitled "ORIENTED MAGNETIC CORE LAMINATION AND METHOD OF MANUFACTURE," which claims priority to U.S. Provisional Application No. 62/937,639 filed on Nov. 19, 2019 and Canadian Application No. 3,061,931 filed on Nov. 19, 2019 each of which are incorporated by reference herein in their entireties.

TECHNICAL FIELD

The present invention relates to laminated electrical steel cores. More specifically, the present invention relates to lamination cores for electric motors and methods for producing circular laminates.

BACKGROUND

Laminated electrical steel (also known as silicon steel) cores are an indispensable component of electric motors. The steel core is used to amplify the magnetic flux generated by the electric current passing through the coils. It is required that the magnetic properties of the steel core be optimum in all directions of the sheet plane, so that minimum energy losses and maximum efficiency can be achieved. This requires that the easy magnetization axes (<001> for body-centered cubic iron) of the crystals be aligned evenly to all the directions in the sheet plane. However, this is essentially impossible in polycrystalline materials since, during thermomechanical processing of the steel to produce the thin sheets, the crystals in the material tend to form preferred orientations (textures) that are usually different from the desired orientations. Ideally, if a very strong <001>//ND (normal direction) texture (preferred orientations) can be produced in the final sheet, the circular laminations punched from the steel sheets would have better magnetic properties than those with randomly oriented grains. However, the metallurgical mechanisms governing the formation of the crystallographic textures usually lead to an unfavorable <111>//ND texture, and the production of a <001>//ND texture is normally achieved only through special processes that are usually not feasible nor economical in mass production. On the other hand, even though it might be possible to produce the desired texture (with an intensity of a few times higher than random) in non-oriented electrical steels, it is still very difficult to completely eliminate the detrimental textures in the microstructure. Thus, currently, the magnetic properties of the lamination core made from non-oriented electrical steel sheets are still far from optimum.

Nevertheless, even in a non-oriented electrical steel without an optimum texture, there usually exists a direction (in the sheet plane) in which the magnetic property is better than in other directions (the existence of anisotropy). Using the current lamination method, i.e. stamping circular laminates from the steel sheets and stacking up the individual laminates to form the core, one could not align all the magnetization directions to this direction, thus the magnetic properties of the steel sheets are not optimally utilized. Even for steel sheets with a strong <001>//ND texture, the advantage of the <001>//ND texture may not be completely utilized, since usually there exists a strongest <100> crystal direction in the sheet plane, and the magnetization directions of the laminates are in all the directions in the sheet plane, not only in the direction with the strongest <100>.

It is well known that grain-oriented electrical steel has been routinely produced with a microstructure containing large crystals with a single {011}<100> orientation (the Goss texture) which delivers excellent magnetic properties in the rolling direction (RD). This steel has long been used in transformers as the magnetic core since, in a transformer, the magnetic flux is generated along the rolling direction. Due to its high anisotropy (i.e. much better magnetic properties in the RD than in the transverse direction, TD), grain-oriented electrical steel is not ideal for use in rotating machines (electric motors), where it is required that the magnetic flux be maximized in all directions of the sheet plane.

Current procedures for the production of lamination core for electric motors include: a) producing thin, non-oriented electrical steel sheets by hot rolling, cold rolling and annealing, b) coating the surfaces of the sheets, c) punching circular laminates from the coated sheets with teeth pointing to all the directions of the sheet plane, d) stacking the laminates and forming the magnetic core, e) stress-relief annealing. As shown in FIG. 1, since the teeth are pointing to all the directions in the sheet plane, it is required that the sheet have optimum properties in all the directions. This is currently not achievable through conventionally thermomechanical processing.

To obtain uniform and optimum magnetic properties in all the directions in the sheet plane, the traditional method is to try to reduce the anisotropy of the steel sheet by randomizing the texture or try to reduce the <111>//ND texture and to increase the <001>//ND texture. However, it has proven to be very difficult to produce a texture with <100> uniformly distributed in all the directions of the sheet plane, since crystals with the <001>//ND orientations only have two <100> directions in the sheet plane, e.g., the ideal cube texture {001}<100> has two <100> directions in the RD and TD. It is very difficult to produce the desired texture using traditional processing technologies. Thus, even with all the efforts made, no significant improvement of the non-oriented electrical steel has so far been achieved. It is essentially impossible to achieve the same performance of the grain-oriented electrical steel in transformers (optimized in RD only) as in electric motors (optimized in all the directions).

Another existing lamination technology is the slinky or helical lamination. The slinky lamination technique uses a long and narrow steel strip cut from the steel sheets along the rolling direction to form a helical core by bending the long strip around a central mandrel (instead of punching the circular laminates directly from the sheets) so that a continuously stacked core is made. Although this process can save materials because of the use of straight strips cut from the steel sheet, there is a major issue with this type of lamination. The issue is that, since all the layers of the lamination are physically connected, the eddy current loss is be large, since the helical core is essentially made of a thick piece of electrical steel plate with a thickness of the entire magnetic core. This creates a large eddy current loss. Thus, this lamination method is usually only used in small alternators or motors where energy loss is not a major concern. On the other hand, since the teeth of the slinky laminated cores are always aligned to the transverse direction (TD) of the steel sheet, it is not possible to take the advantage of a textured material if the <100> is not in the TD, e.g. the grain oriented steel where the <100> is in the RD.

Since it is essentially not possible to produce the required crystal orientations with the easy <100> axes in all the directions in the sheet plane, current lamination methods cannot achieve the desired magnetic properties using non-oriented electrical steel sheets. On the other hand, the traditional punching and stacking process detailed above generates a large amount of material waste (up to 80%), because only the teeth and the yoke parts are used, and the rest of the steel sheets will be scrapped. To maximize the magnetic properties and reduce the material waste, a new lamination process is needed.

SUMMARY

The present invention relates to magnetic core lamination and to a method of producing lamination cores. The method includes cutting rectangular strips with the short side (the teeth) aligned in the single direction that has the best magnetic properties in the steel sheet (may not be the traverse or rolling direction), as opposed to directly punching circular laminates from the steel sheet with the teeth pointing in all directions. The strips are then bent along the long side to form a circular (donut or toroidal) shape (with the ends joined), either inwardly (with the teeth pointing to the circle center) or outwardly (with the teeth pointing out from the center) depending on the design of the lamination core. The direction with the best magnetic properties in the sheet plane may be determined prior to the strip cutting by magnetic Barkhausen noise (MBN) analysis, Epstein frame testing, single sheet testing, or through conventional texture measurements means such as x-ray diffraction (XRD), or electron backscatter diffraction (EBSD), or neutron diffraction. The toroidal-shaped sheets are finally punched into the final circular laminates with the teeth pointing to the direction with the best magnetic properties.

In a first aspect, the present invention provides a method for producing lamination cores, the method comprising: cutting rectangular strips with teeth pointing in a single direction from steel sheets such that the teeth are aligned in a direction that has the best magnetic properties.

In another aspect, the present invention provides a method for producing laminates suitable for producing lamination cores, said laminates being produced from steel sheets, the method comprising:

a) determining a preferred crystal direction on said steel sheets;

b) cutting strips from said steel sheets, said strips being suitable for manufacture of laminates having teeth such that said teeth are aligned in said preferred crystal direction;

c) executing steps d1)-d4) or steps e1)-e3);

wherein steps d1)-d4) comprises:

d1) removing excess material from said strips;

d2) forming a toroidal shape from said strips by bend-ing said strips and joining ends of said strip to one another wherein excess material removed in step d1) facilitates said bending;

d3) removing further material from said toroidal shape to form teeth, thereby resulting in said laminate having teeth;

d4) ending said method;

and wherein steps e1)-e3) comprises:

e1) removing material from said strips to form teeth;

e2) bending said strips into said toroidal shape and joining ends of said strip to one another to thereby result in said laminate having teeth; and e3) ending said method.

In a further aspect, the present invention provides a method for producing laminates suitable for magnetic cores, said laminates being produced from rectangular strips cut from steel sheets, the method comprising:

a) determining a preferred direction having the strongest <100> crystal orientation, or a direction having the best magnetic properties on said steel sheets;

b) cutting rectangular strips from said steel sheets, said rectangular strips being suitable for the manufacture of circular laminates and having the short side aligned in said preferred direction;

c) executing steps d1)-d4) or steps e1)-e3);

wherein steps d1)-d4) comprises:

d1) removing excess material from said strips;

d2) forming a toroidal shape from said strips by bend-ing said strips along a long side and joining ends of said strip to one another wherein the excess material removed in step d1) facilitates said bending;

d3) removing further material from said toroidal shape to form teeth, thereby resulting in said laminate having teeth;

d4) ending said method;

and wherein steps e1)-e3) comprises:

e1) removing material from said strips to form teeth;

e2) bending said strips into said toroidal shape and joining ends of said strip to one another to thereby result in said laminate having teeth; and e3) ending said method.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
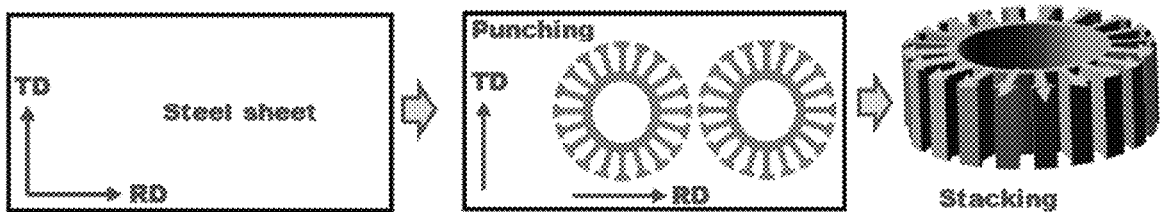
FIG. 1 is a flow chart showing the lamination process for non-oriented electrical steels according to the prior art.

The present invention provides a new lamination method where, instead of directly punching circular laminates from the steel sheet with the teeth pointing in all directions, rectangular strips with teeth pointing in a single direction (may not be the TD or RD) are first cut from the steel sheets. The strips are cut in such a way that the teeth are aligned to the direction (in the sheet plane) that has the best magnetic properties. The direction with the best magnetic properties is determined by using a non-destructive evaluation method, i.e. magnetic Barkhausen noise (MBN) analysis or conventional magnetic property measurement methods such as Epstein frame testing, single sheet testing, or other non-destructive evaluation methods. Alternatively, conventional texture analysis methods such as x-ray diffraction (XRD), electron backscatter diffraction (EBSD), and neutron diffraction methods can be used to determine the preferred direction (i.e., with the strongest <100>) through texture analysis of small samples cut from the steel sheets.

For example, for grain-oriented electrical steel, the texture is Goss ({110}<001>) which has the <001> crystal direction in the rolling direction, the alignment of the teeth in this direction will allow the magnetization in the easy axis of the material and reduce the core loss while improving the magnetic flux density. In this case, the RD should be the teeth direction. The MBN angular measurement on this steel sheet indicates that the largest MBN energy (or MBN root mean square, rms) is in the RD. If the measured texture has a rotated Goss ({110}<110>) which has the <001> direction in the transverse direction, the teeth will be aligned to the TD, i.e. again in the crystal <100> direction (the highest MBN energy). Different from the slinky lamination method where the strip is continuously bent to form a helical core, the new method uses individual laminates to stack up to form the magnetic core. This is to reduce the eddy current loss by using thin steel laminates. In one alternative, the individual laminates have an insulating coating on both sides, similar to traditional laminates that are cut from coated steel sheets.

More generally, by measuring angular MBN energy (or by measuring magnetic properties using the Epstein frame method or using a single sheet tester) on the steel sheet or measuring the crystallographic texture of cut samples from the sheet, one can identify the direction with the best magnetic properties in the sheet plane and thus align the teeth of the strips in this direction. The strips with unidirectional teeth are then bent either inward or outward (depending on the configuration of the rotator or stator) to form a circular lamination. The two ends of the strip are joined or attached to form a complete circle, forming a conventional laminate. In this way, the teeth (along which the magnetization is applied) will be aligned in the direction having the best magnetic properties, while the waste of material is also minimized.

Figure 2:
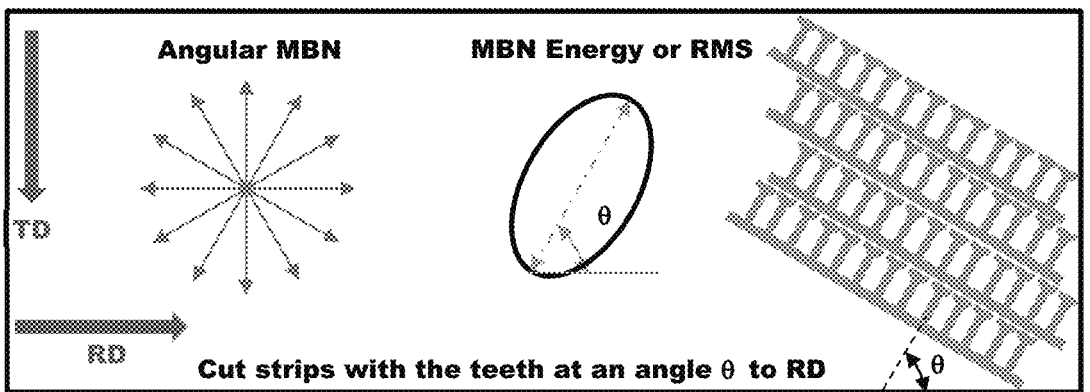
FIG. 2 shows a determination of the direction with optimum magnetic properties using MBN and the alignment of the teeth in this direction.

The determination of the best magnetic direction in the sheet plane is preferably done by non-destructive MBN by means of angular measurements (0°-360° from the RD, with a fixed interval, e.g. 15°). The direction at which the MBN has the highest energy or rms value is the direction for the magnetization. The MBN measurements can be conducted online during the sheet production, or offline after the sheet has been produced. An example of the MBN angular measurements of the magnetization direction on steel sheet is shown in FIG. 2. Alternatively, the best magnetic direction in the sheet plane can also be determined by conducting conventional (destructive) testing (e.g. Epstein frame method or single sheet testing) using cut samples from the steel sheets.

Figure 3:
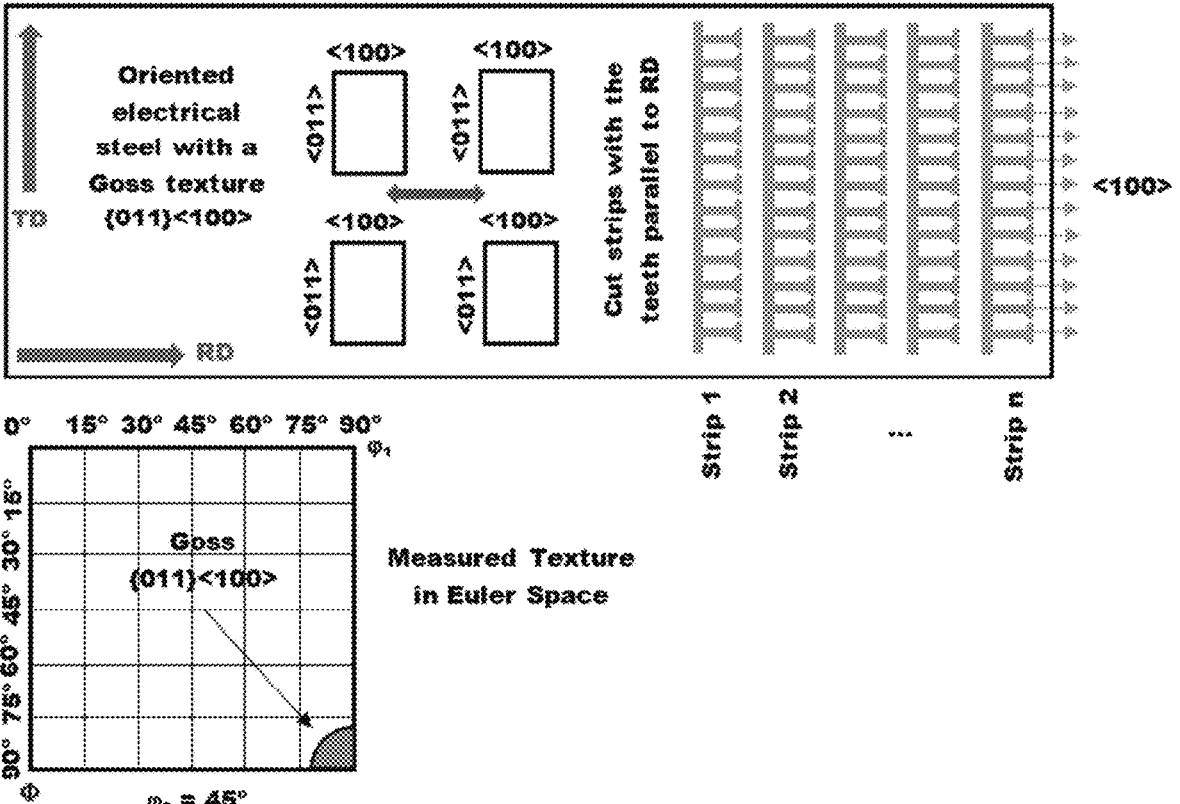
FIG. 3 shows a determination of the optimum direction by texture measurement: grain-oriented steel and the alignment of the teeth to the RD.
Figure 4:
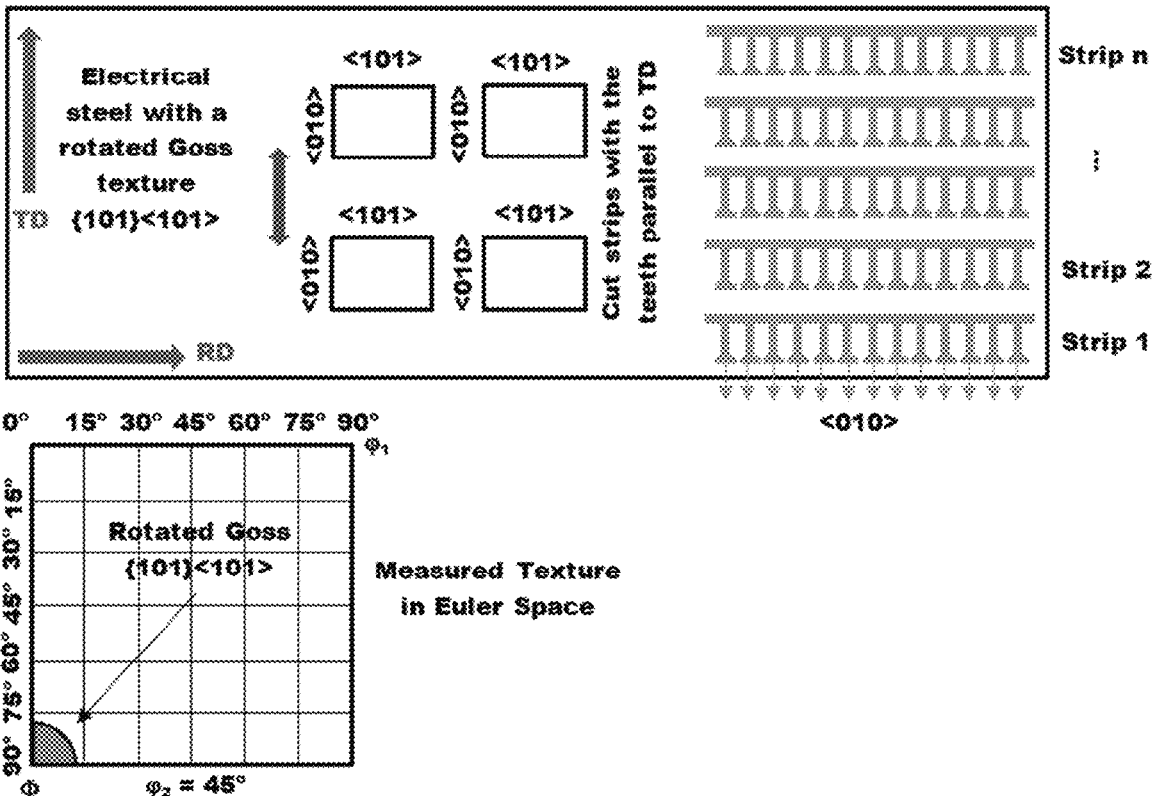
FIG. 4 shows a determination of the optimum direction by texture measurement: non-oriented electrical steel with a rotated Goss texture and the alignment of the teeth to the TD.
Figure 5:
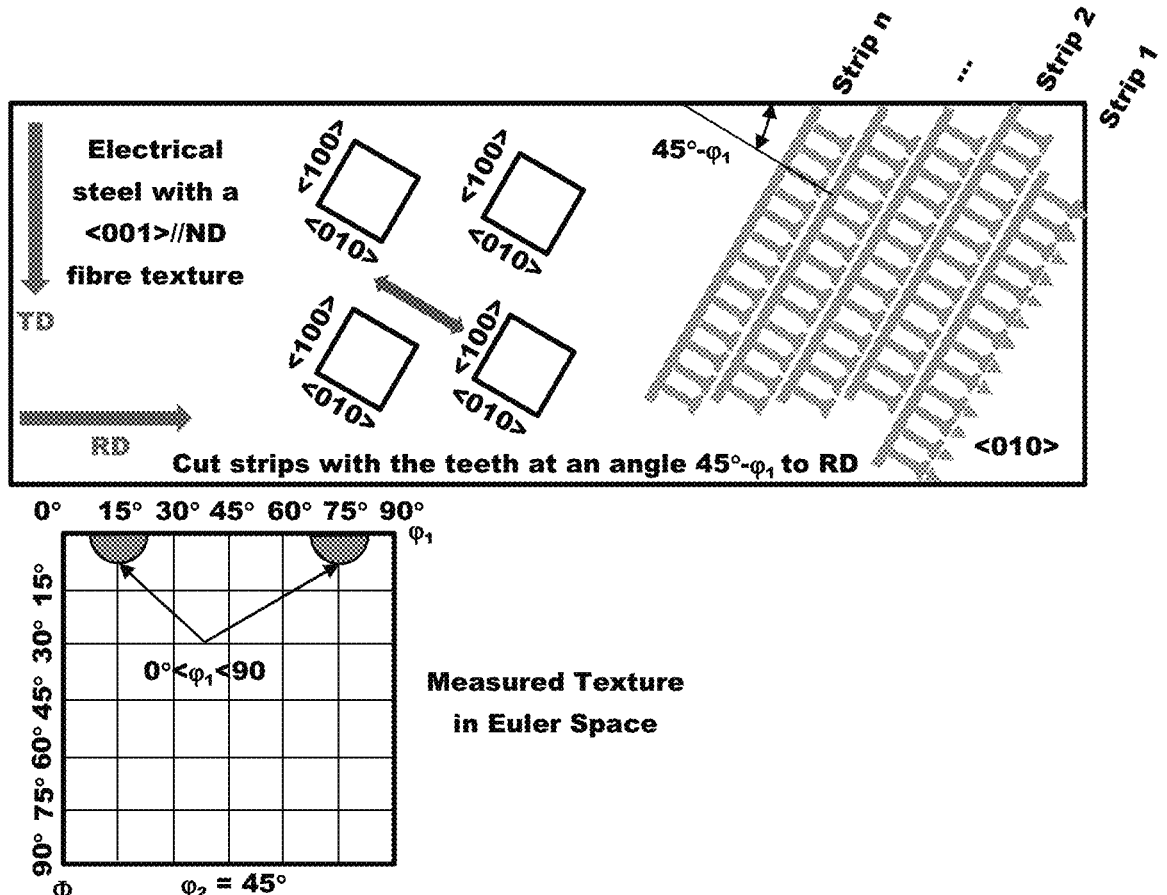
FIG. 5 shows a determination of the optimum direction by texture measurement: non-oriented electrical steel with a <001>//ND texture and the alignment of the teeth to an angle $45°-\varphi_1$ from RD.

Alternatively, the optimum direction can also be determined using conventional texture analysis (destructive) methods, e.g. texture measurements by XRD or EBSD from samples cut from the sheet. In this case, the magnetization direction (the teeth) should be aligned to the direction where the <100> has the largest intensity. A few examples of aligning the strip teeth direction to the preferred crystal directions are shown in FIGS. 3-5.

Figure 6A:
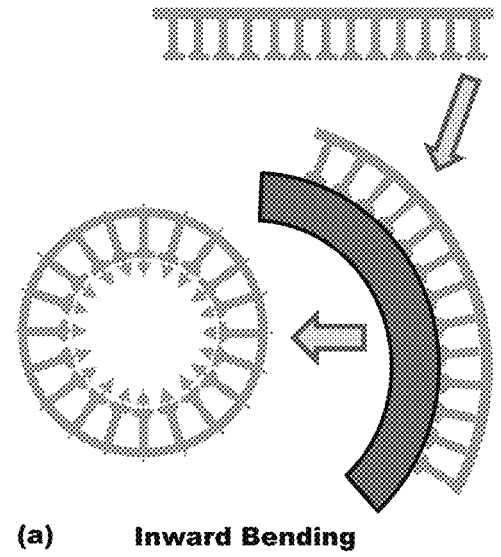
FIG. 6A shows inward bending of the strips into circular laminates.
Figure 6B:
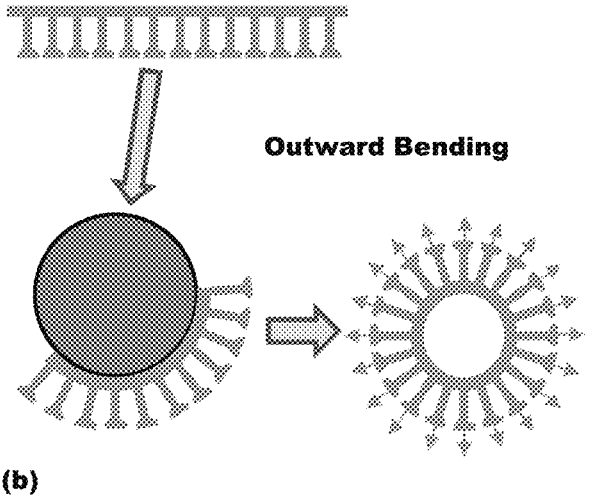
FIG. 6B shows outward bending of the strips into circular laminates.

The strips cut from the steel sheets are then individually bent to form circular laminates as in conventional lamination processes. This can be performed either inwardly (with teeth pointing to the circle center) or outwardly (with teeth pointing out of the center), depending on the design of the lamination core. FIGS. 6A and 6B shows the bending of individual strips into circular laminates.

Figure 7:
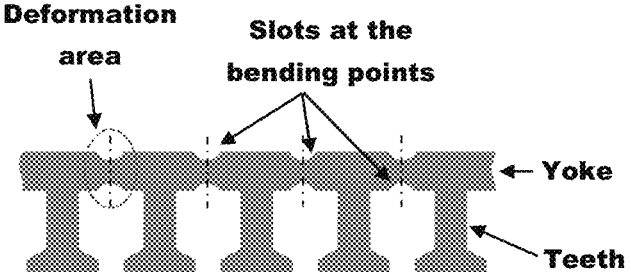
FIG. 7 shows cutting slots in the bending locations to minimize the bulging during in-plane bending.

Compared to the conventional stamping and stacking process, the strip cutting and bending process of the present invention may impose challenges to the quality and efficiency of the final manufactured laminates. To overcome the issues facing the new process, the following methods may be used:

To facilitate the in-plane bending of the strips and to minimize the deformation (bulging) in the normal direction of the strips, slots are cut on both sides of the yoke where bending occurs, to reduce the deformation needed and to localize the bending to the designated area (FIG. 7).

Figure 8:
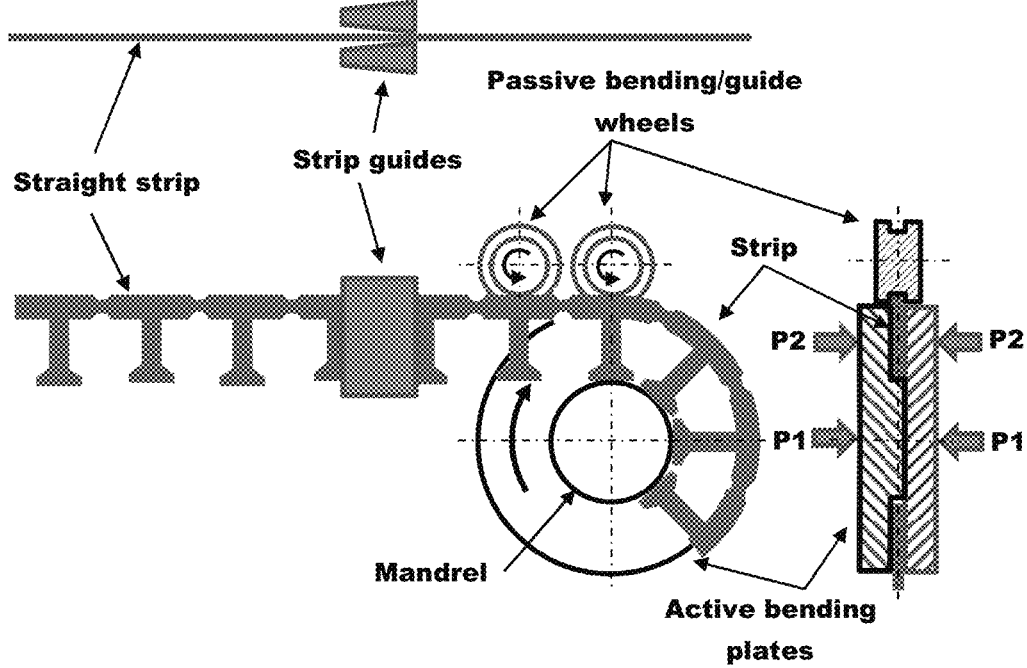
FIG. 8 shows bending the strip in between two rotating plates with applied pressure on the surfaces of the bending plates to ensure in-plane bending.

In one alternative, to maintain a flat surface at the bending area, the bending deformation of the strip is constrained in between two rotating plates with applied pressure to allow only in-plane deformation (FIG. 8). This is to ensure that the bent strips have a flat circular surface.

Figure 9:
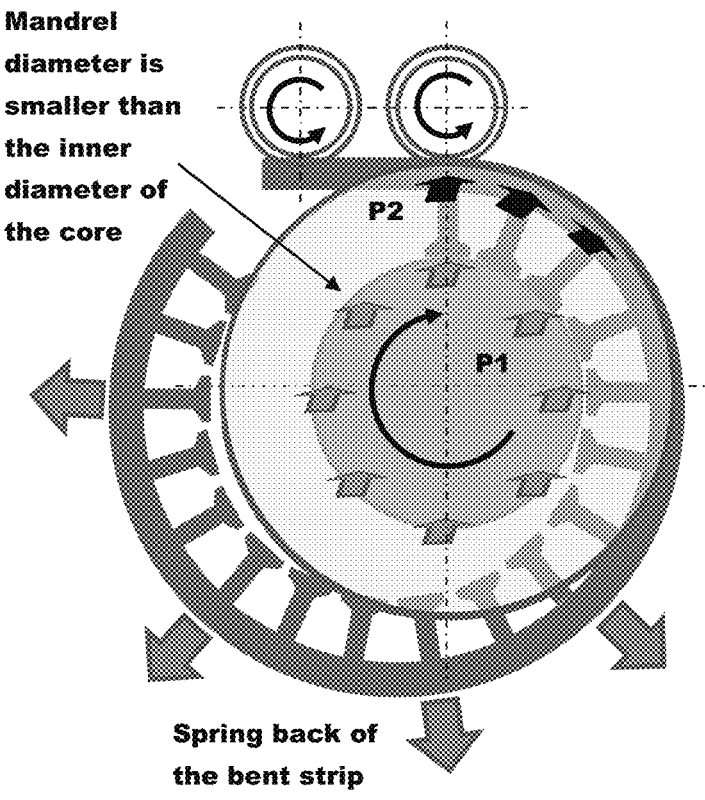
FIG. 9 shows the spring back of the bent strip and the formation of a complete circular laminate.

The pressure applied to the rotating plates may be divided into two parts. The part of the pressure applied to the center of the plates (P1) will be kept evenly and constantly during the bending process to ensure that, an even slot (with a space equal to the thickness of the strip) between the two plates is maintained. The part of the pressure applied on the periphery of the plates (P2) will be maintained only near the region where the bending deformation occurs so that the bent strip can be released and can spring back out of the mandrel, which will give space for the formation of a complete circle at the end, as shown in FIG. 9. The periphery pressure (P2) is intended to generate appropriate friction force between the strip and the two plates so that the strip is driven by the rotating plates into the slot and deformed.

To ensure that the bent strip can be easily released from the mandrel between the two plates, the mandrel can be manufactured on one plate only while the other plate has a flat surface (FIG. 8). When pressed together, the slot between the two plates provides the space for in-plane deformation. When the plate with the mandrel is retracted, the bent strip can be freely removed and transferred to the next working location.

To compensate for the spring back, the mandrel diameter is preferably smaller than the required inner diameter of the core (FIG. 9). The amount of reduction in diameter is determined by the mechanical properties of the material to be bent.

Figure 10A:
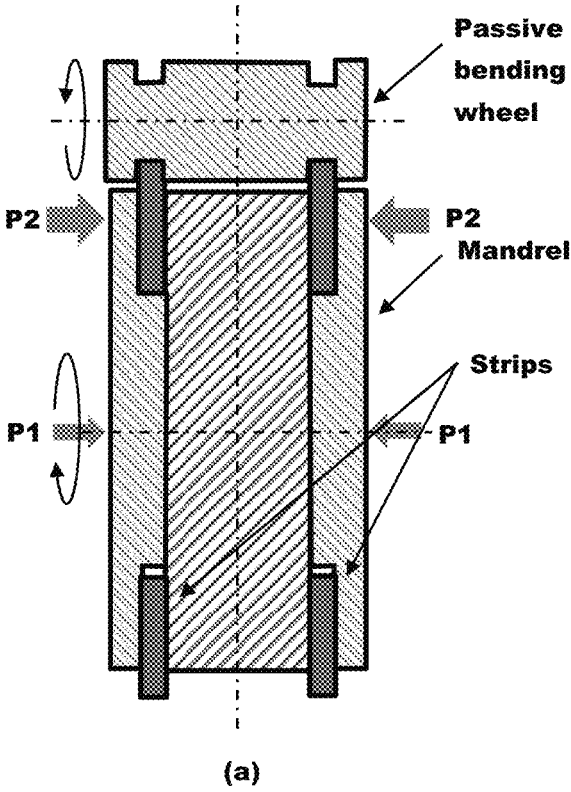
FIG. 10A shows double strip bending: two strips bent within a pair of mandrels.
Figure 10B:
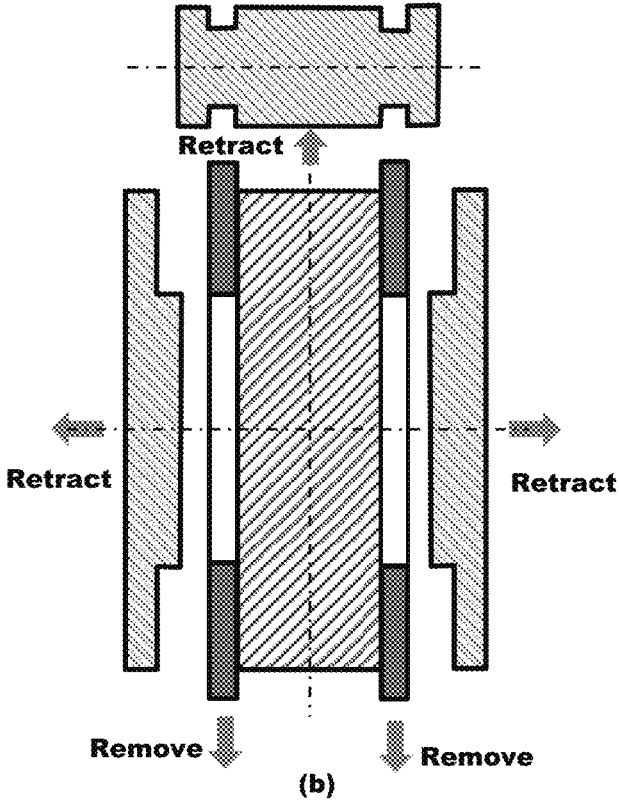
FIG. 10B shows double strip bending: retracting the mandrels and bending wheel to remove the bent strips.

The rotating plates and the mandrel may be designed in such a way that two strips can be bent in the same time to increase the efficiency (FIG. 10). To remove the bent strips, the mandrels and the passive bending wheel are retracted to free up the bent strips.

Figure 11:
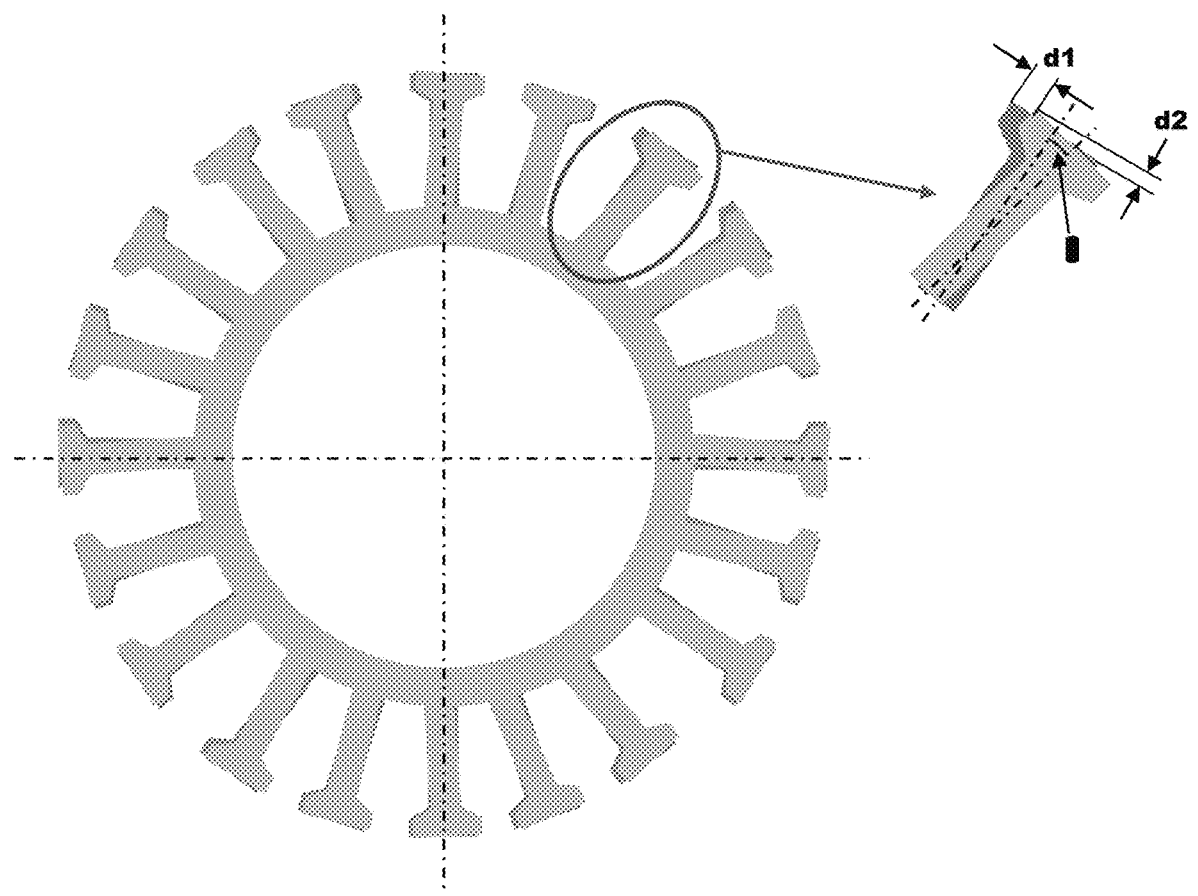
FIG. 11 shows the misalignment of teeth between laminates caused by the mis-oriented teeth generated in the bending process.
Figure 12:
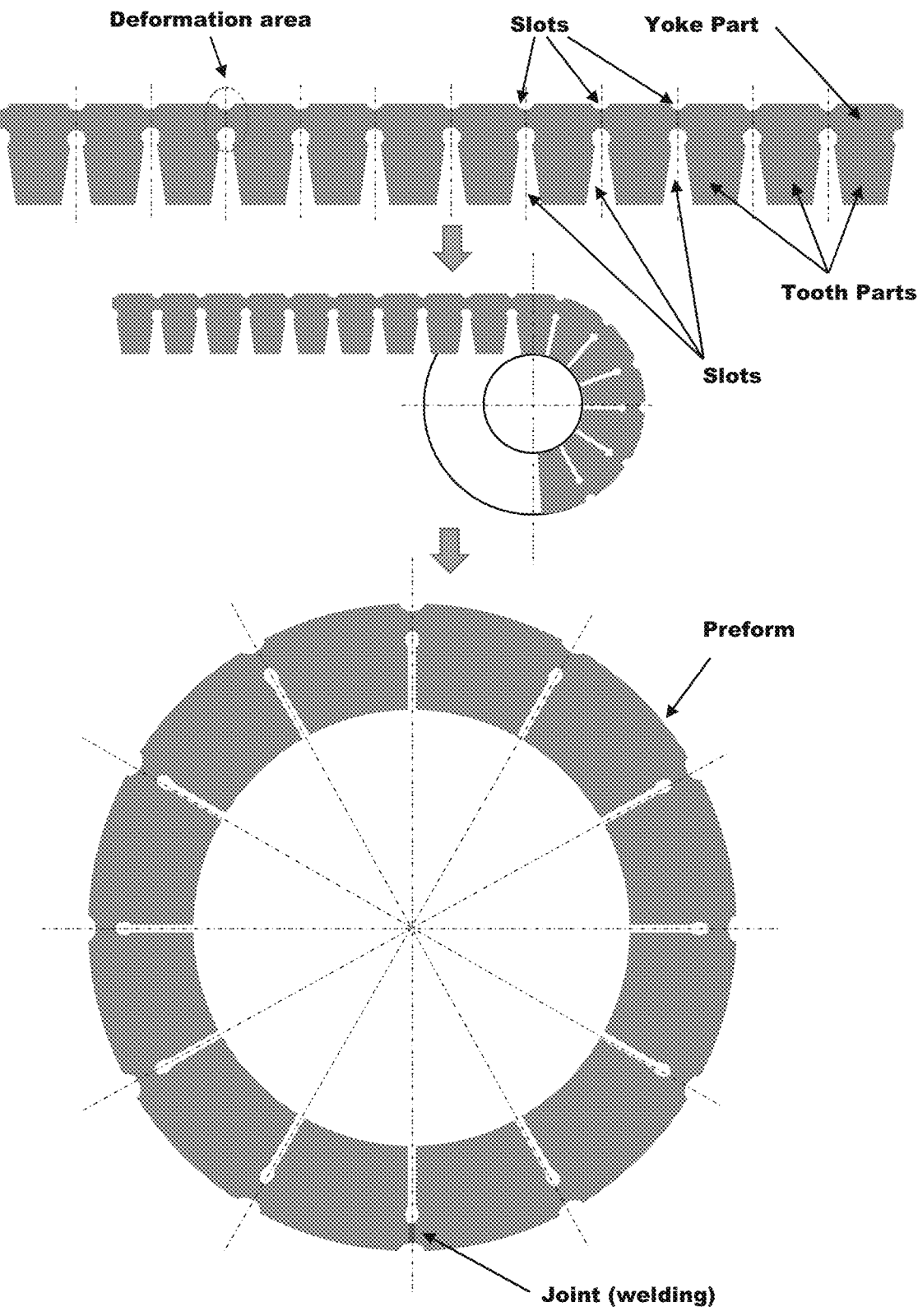
FIG. 12 shows the cutting and inward bending preform strip to form a donut-shape sheet.
Figure 13:
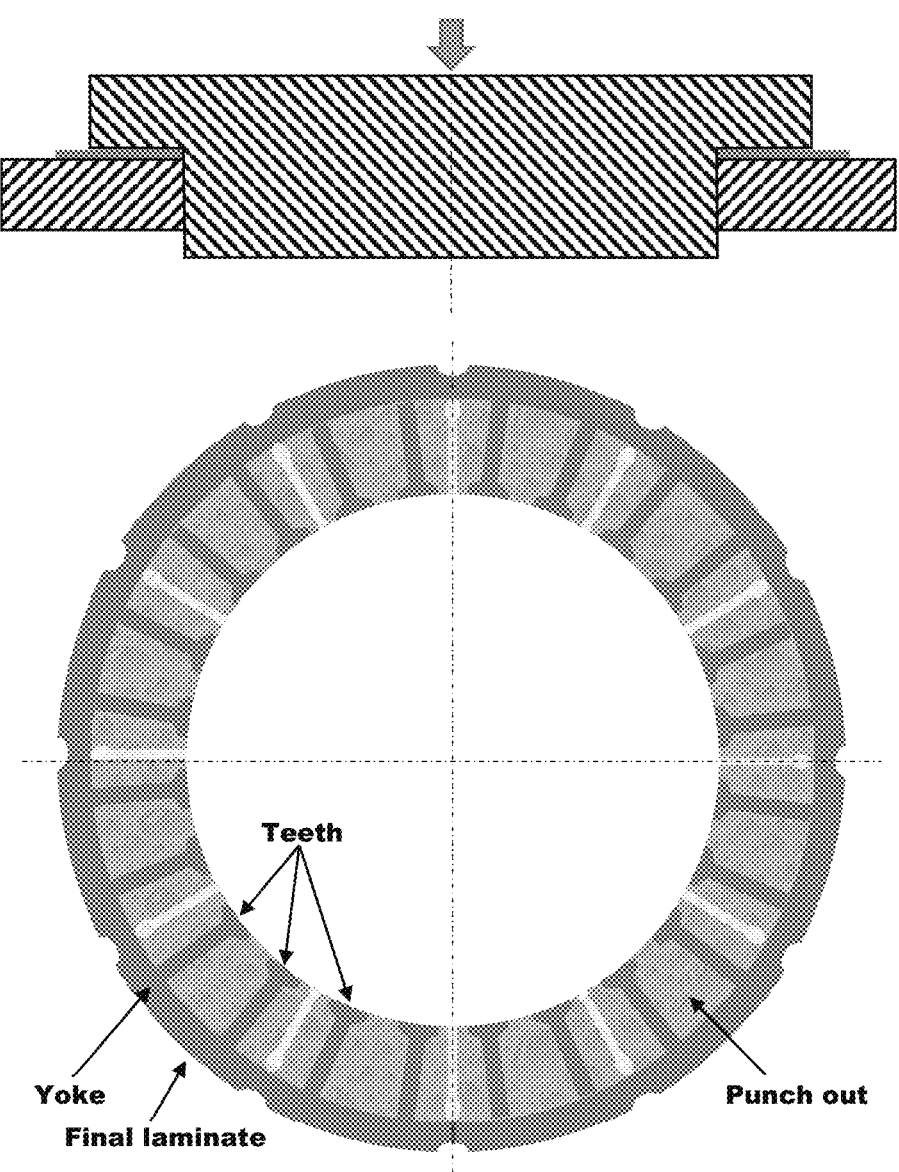
FIG. 13 shows punching of the circular donut-shaped sheet to form the final laminate with accurate teeth dimensions and inner and outer diameters (inward bending case)
Figure 14:
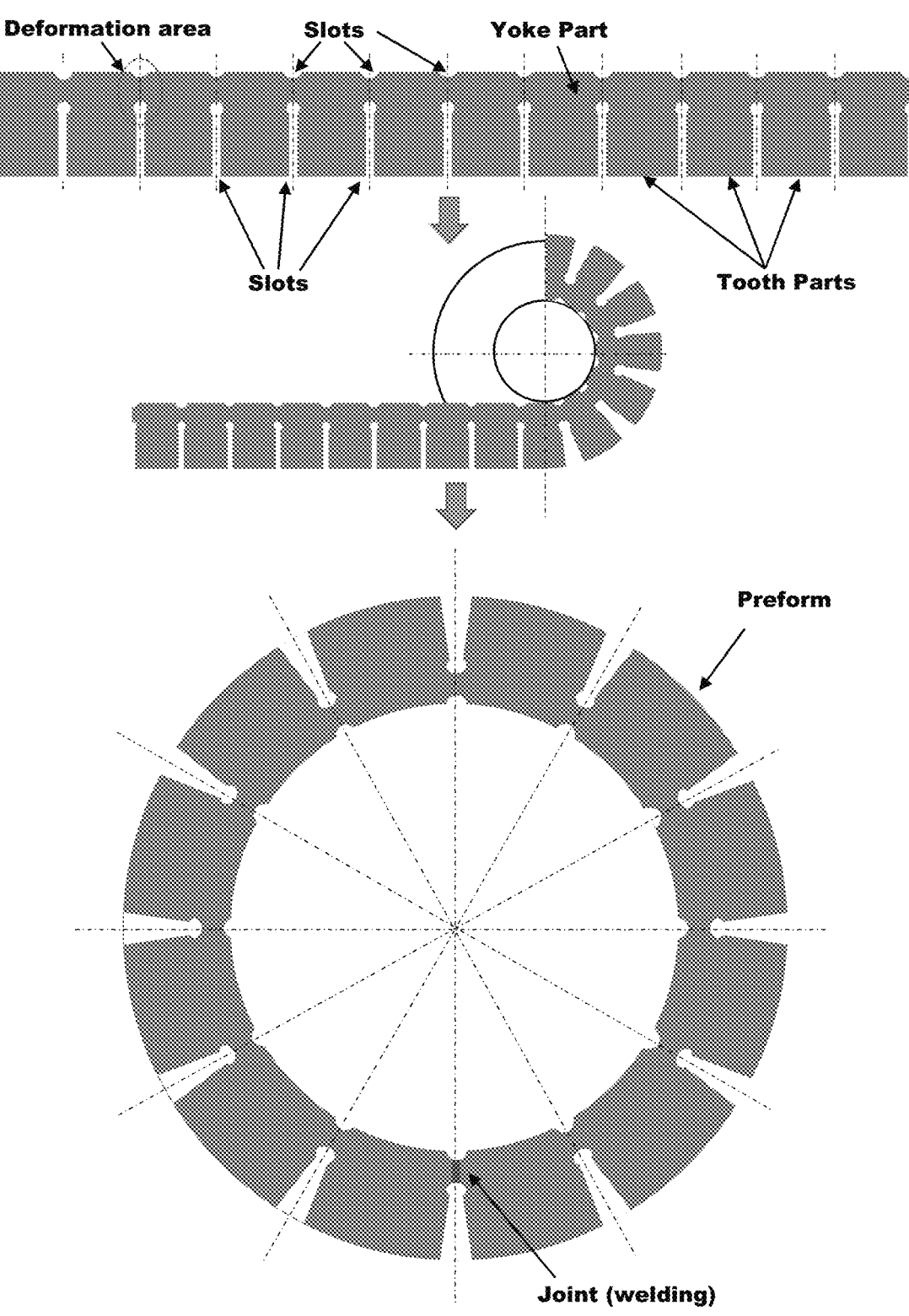
FIG. 14 shows the cutting and outward bending preform strip to form a donut-shape sheet.
Figure 15:
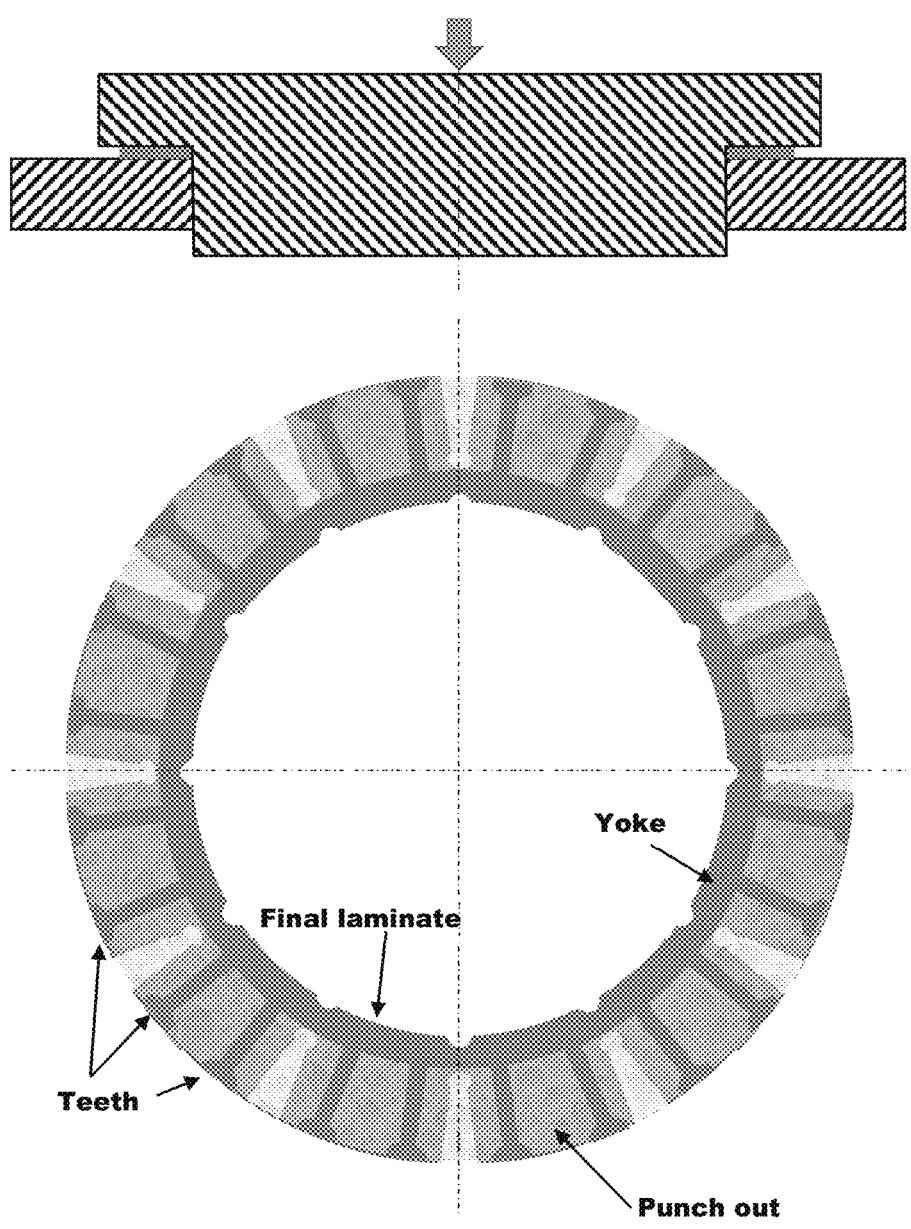
FIG. 15 shows punching of the circular donut-shaped sheet to form the final laminate with accurate teeth dimensions and inner and outer diameters (outward bending case)

One potential issue of the lamination process of the present invention is the poor accuracy of the teeth (orientation and dimension) generated by the bending process (instead of the punching process). Due to material non-uniformity, the bending process to form the center-pointing or radial-pointing teeth from straight teeth may inevitably induce inaccuracy to the teeth direction. This inaccuracy will induce difficulties in the following assembling process since it will be challenging to obtain accurately aligned teeth for all the laminates (FIG. 11). The inner and outer diameters of the assembled lamination core will not be accurate either, due to the mis-oriented teeth. It is well known that the performance of the motor is closely related to the air gap between the rotor and stator, and it is generally preferable to have a smaller air gap to render a better performance. The dimension inaccuracy of the magnetic core produced using this new method will inevitably affect the motor performance. Thus, a new process, as explained below, is provided to overcome these potential issues.

In FIG. 11, a small mis-orientation angle δ may induce a large inaccuracy in the diameter of the core and the space for coils.

Figure 16:
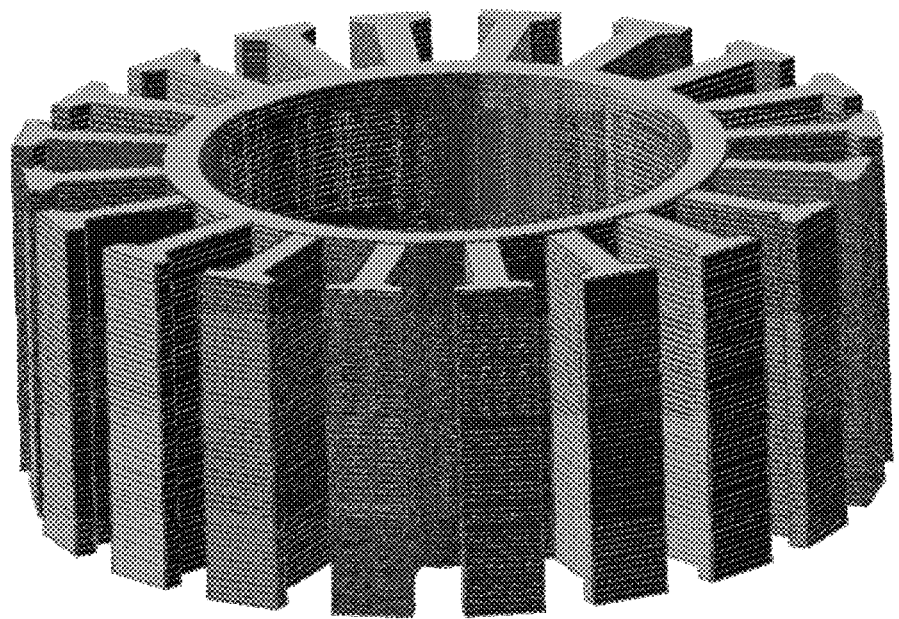
FIG. 16 shows an oriented magnetic core stacked from individual laminates.

The method according to one aspect of the present invention is schematically illustrated in FIGS. 12 to 15. Instead of cutting out the strips with the exact teeth geometry and dimensions, a preform strip is first cut from the steel sheet. Slots are cut on the preform strip at locations where bending occurs to facilitate the bending process. The preform strip is then bent to form a donut-shaped sheet (FIGS. 12 and 14) using the same bending process as described above. The ends are then joined or attached using a conventional method (e.g. resistant welding, friction stir welding or other welding techniques). The circular sheet is then punched using a die (FIGS. 13 and 15) to form the final laminate with accurate teeth dimensions and core diameters (similar to what is used in conventional punching and stacking processes). In this manner, the inaccuracy issue associated with the novel bending process is avoided. FIG. 16 shows the final magnetic core stacked from the laminates manufactured using this novel method.

The lamination process described above has several advantages over the traditional punching and stacking or the slinky lamination methods:

The waste of the material can be significantly reduced as compared to the traditional punching and stacking method.

It is possible to use existing high-quality grain-oriented electrical steel to manufacture electric motor cores with excellent magnetic properties (comparable to the transformers) in all the directions.

It is able to take the advantages of preferred orientations in the non-oriented electrical steel sheets where the easy <100> direction can be aligned to the magnetization direction.

It can significantly reduce the eddy current loss as compared to the slinky lamination method, in which all the layers of the lamination are physically connected, which will result in much higher losses than the proposed directional lamination method (the laminates are insulated).

The dimension accuracy is much better than the slinky lamination method and is comparable to the traditional punching and stacking method.

In one aspect, the current invention provides a novel lamination technique so that the magnetization directions of the laminates can be precisely aligned to the direction in which the magnetic properties of a textured steel sheet are the best. This method can be used to manufacture magnetic cores from both grain-orientated and non-oriented electrical steel sheets to optimize the efficiency of the magnetic core while significantly reducing the material waste.

The present invention may be used in any electric motor lamination core manufacturing, including traction motors for electric vehicles, electric motors for general machines and all kinds of generators including windmills.

The present invention has a number of differences with known techniques and technologies. Specifically:

The alignment of the teeth to the crystal <001> direction of electrical steel sheet is different from the conventional method that punches the circular laminate directly from the sheet and pointing the teeth to all the directions.

Determining the crystal easy <100> direction before stamping the steel sheets is unique, as this will enable the alignment of the magnetization direction to the easy axis of the material, which will improve the efficiency of the magnetic core.

The use of non-destructive magnetic Barkhausen noise (MBN) analysis to determine the easy magnetization axis of the material is different as compared to the traditional magnetic property or texture measurements, which are destructive.

Using grain-oriented electrical steel to produce high performance electric motor core is different, as this steel is normally used in transformers only.

The way the individual sheet is bent in between two plates to ensure in-plane deformation of the strip thus avoiding bulging during bending is novel.

The way multiple strips can be bent together is unique.

The way that the sheet was cut into preform strips and bent to form donut-shaped sheets is novel.

The way that the donut-shaped sheets were further punched to form the final accurate laminates is novel.

A person understanding this invention may now conceive of alternative structures and embodiments or variations of the above all of which are intended to fall within the scope of the invention as defined in the claims that follow.

We claim:

1. A method for producing laminates suitable for magnetic cores, said laminates being produced from steel sheets, the method comprising:

a) determining a preferred crystal direction on said steel sheets;

b) cutting strips from said steel sheets, said strips being suitable for manufacture of laminates having teeth such that said teeth are aligned in said preferred crystal direction;

c) executing steps d1)-d3) or steps e1)-e2);

wherein the steps d1)-d3) comprise:

d1) removing an excess material from said strips;

d2) forming a toroidal shape from said strips by bending said strips and joining ends of said strips to one another wherein the excess material removed in step d1) facilitates said bending;

d3) removing a further material from said toroidal shape to form the teeth, thereby resulting in said laminates having teeth;

and wherein the steps e1)-e2) comprise:

e1) removing a material from said strips to form teeth; and e2) bending said strips into said toroidal shape and joining ends of said strips to one another to thereby result in said laminates having teeth.

2. The method according to claim 1 wherein the step a) is executed using at least one of:

magnetic Barkhausen noise (MBN) analysis;

x-ray diffraction (XRD);

electron backscatter diffraction (EBSD);

Epstein frame testing;

single sheet testing; and neutron diffraction.

3. The method according to claim 2 wherein said preferred crystal direction is a direction with the largest MBN energy.

4. The method according to claim 1 wherein the step a) is executed using one of:

a destructive testing method; and a non-destructive testing method.

5. The method according to claim 1 wherein said step of removing the material in any of steps d1, d3, and e1 is executed by punching using a die.

6. The method according to claim 1 wherein said teeth in said laminates are facing away from a center of said toroidal shape.

7. The method according to claim 1 wherein said teeth in said laminates are facing towards a center of said toroidal shape.

8. The method according to claim 1 wherein, in the step e1), said material removed to form the teeth includes the material such that slots are formed on both sides of a yoke where the bending occurs when said strip is bent into said toroidal shape.

9. The method according to claim 1 wherein the step e2) is executed using two rotating plates with an applied pressure such that only in-plane deformation is allowed.

10. The method according to claim 1 wherein said excess material removed in the step d1) is removed such that slots are formed on both sides of a yoke part where the bending occurs when said strip is bent into said toroidal shape.

11. The method according to claim 1 wherein ends of said strip are joined to one another using at least one of:

welding;

friction stir welding; and resistant welding.

12. The method according to claim 1 wherein said further material removed in the step d3) is removed such that both a yoke and the teeth are formed.

13. The method according to claim 1 wherein the laminates formed in any of steps d3 and e2 are stackable to form a magnetic core for an electric motor.

14. The method according to claim 1 wherein said preferred crystal direction is a direction with the lowest core loss.

15. The method according to claim 1 wherein said preferred crystal direction is a direction with a largest <100> intensity.

16. A method for producing laminates suitable for magnetic cores, the method comprising:

a) determining a preferred direction having the strongest <100> crystal orientation, or a direction having preferred magnetic properties on steel sheets;

b) cutting rectangular strips from said steel sheets, said rectangular strips being suitable for a manufacture of circular laminates and having a short side aligned in said preferred direction;

c) executing steps d1)-d3) or steps e1)-e2);

wherein said laminates are produced from said rectangular strips cut from steel sheets;

wherein the steps d1)-d3) comprises:

d1) removing an excess material from said strips;

d2) forming a toroidal shape from said strips by bending said strips along a long side and joining ends of said strips to one another wherein the excess material removed in step d1) facilitates said bending;

d3) removing a further material from said toroidal shape to form the teeth, thereby resulting in said laminates having teeth;

and wherein the steps e1)-e2) comprises:

e1) removing a material from said strips to form teeth; and e2) bending said strips into said toroidal shape and joining ends of said strips to one another to thereby result in said laminates having teeth.

17. The method according to claim 16 wherein the step a) is executed using at least one of:

magnetic Barkhausen noise (MBN) analysis;

x-ray diffraction (XRD);

electron backscatter diffraction (EBSD);

Epstein frame testing;

single sheet testing; and neutron diffraction.

18. The method according to claim 16 wherein the step a) is executed using one of:

a destructive testing method; and a non-destructive testing method.

* * * * *